Dec. 1, 1970     M. MICHELSON     3,544,999
COUPLING CIRCUITS FOR SCANNING ANTENNAS AND THE LIKE
Filed May 4, 1960     2 Sheets-Sheet 1

INVENTOR
MAX MICHELSON

BY Melvin E. Frederick
ATTORNEY

United States Patent Office 3,544,999
Patented Dec. 1, 1970

3,544,999
COUPLING CIRCUITS FOR SCANNING ANTENNAS AND THE LIKE
Max Michelson, Framingham, Mass., assignor to Raytheon Company, Lexington, Mass., a corporation of Delaware
Filed May 4, 1960, Ser. No. 26,911
Int. Cl. H01q *3/26;* H01p *1/32*
U.S. Cl. 343—100         10 Claims

ABSTRACT OF THE DISCLOSURE

A coupling circuit for COSRO antennas is provided wherein electromagnetic energy is transmitted in a conventional manner and a conical scan is obtained on receive only. A nonreciprocal ferrite power divider is used whereby there is no power split in the direction of transmission but the energy from the reference and difference arms of the antenna is combined in the direction of reception and passes to the receiver through a duplexer.

---

The invention herein described was made in the course of or under a contract or subcontract thereunder, with the Department of Defense.

The present invention relates to coupling circuits for scanning antennas and the like and more particularly to coupling circuits for conical scanning antennas wherein electromagnetic wave energy is transmitted in conventional manner and conical scan on receive only (COSRO) is utilized.

It is often convenient to have an antenna system in which the radiation is lobed, the axis of the lobe being at an angle to an axis about which the lobe rotates. Such scanning systems are sometimes termed "conical" scanning systems because the lobe axis describes a cone in its revolution about the axis of revolution. Such a conical scanning system is used, for example, in conventional conical scanning radar sets. Conical scanning may be obtained in a number of well-known and different ways. For example, in some scanners the scanning action is secured by the motion of a member which changes the phase velocity of energy passing through a waveguide. The waveguide is coupled to a plurality of antenna elements. As the phase velocity is changed, the radiated energy scans a sector of space. Of course, the energy pattern of the antenna also scans for received energy. The operation of these scanners and the correlation of the scanning action by suitable apparatus connecting the waveguide and the moving member to the remainder of the radar apparatus is well known and understood in the art. In other scanners the entire antenna is moved in a predetermined manner to provide the scanning action for transmission and again the energy pattern of the antenna also scans for received energy. However, all such systems are subject to detection by the illuminated target by reason of the fact that a modulation frequency is present because of the conical scanning action, and, hence, suitable countermeasures can be used to provide erroneous tracking information. As a result thereof still other scanning systems are well known and understood in the art wherein electromagnetic wave energy is radiated in conventional manner, which is to say conical scanning on transmission is not used, but conical scanning on receive only is used by varying the energy pattern of the antenna for received energy. Briefly, this may be accomplished, for example, by a separate transmitting antenna and a COSRO receiving antenna or, alternately, a single antenna having a reference arm for transmission and a difference arm or arms wherein the energy pattern is varied to provide COSRO. The latter scanning action may be accomplished, for example, by variation in conventional manner of the phase velocity of the received signals. However, prior art COSRO systems are subject to certain limitations and disadvantages. For example, the transmitted signal must be coupled to the reference or transmitting arm only and for tracking information it is necessary that received signals on the reference arm be combined in a particular manner with received signals on the difference or COSRO arms.

In one known embodiment, heretofore it has been customary to use TR tubes to prevent energy from being radiated on the difference arms. The reliability of TR tubes is not entirely satisfactory and COSRO systems utilizing TR tubes usually require some sort of indicating circuit to detect tube failure. Also, a non-directional power splitter has to be used with a TR tube which results in variations of the power split ratio with variations in VSWR of the antenna arms and non-uniform cross-over values throughout the frequency band of interest. Poor or late firing of the TR tube is a problem and misfiring of the TR tube results in noise being introduced into the receiver of the tracking system. Still further, nearby radars operating in the same frequency band can fire the T/R tube, thus preventing the radar from obtaining any tracking information.

Accordingly, it is the principal object of the present invention to provide a particular simple and desirable coupling circuit.

It is another object of the present invention to provide an improved means for coupling systems for COSRO antennas.

It is a further object of the present invention to provide a coupling system for COSRO antennas having none of the disadvantages pointed out hereinabove.

In accordance with the present invention as applied to radar apparatus utilizing a COSRO antenna, energy from the transmitter is coupled to one port of a nonreciprocal ferrite power divider. The energy entering this port emerges at another port which is connected to the reference arm of a COSRO antenna and the energy is radiated without conical scan. Received energy in the reference arm of the COSRO antenna is, of course, coupled to the last-mentioned port of the aforementioned power divider and emerges at the first mentioned port. The received energy in the difference arm of the COSRO antenna is coupled to a third port of the power divider and is combined in the power divider with received energy in the reference arm to give the desired cross-over value of the COSRO system. The portion of the received energy combined in the power divider which emerges from the first-mentioned port is coupled to the radar receiver or tracking system in conventional manner.

The nonreciprocal ferrite power divider is distinguished from prior art power dividers in the provision of no power split in one diection whereby all power developed by the transmitter is coupled to one port of the power divider and hence to the reference arm of the antenna and a specified power split is provided for received energy traveling from the antenna in the opposite direction through the power divider. Phase shifting in the power divider is provided to secure this result and is accomplished by the provision of ferrite elements in separate arms of the power divider, the provision of reversed magnetic fields applied to one arm with respect to the other arm and the provision of reciprocal phase shifting means in one of the arms. The amount of reciprocal phase shifting essentially determines the cross-over value of the system.

The foregoing and other objects, advantages and novel features of the present invention will be more apparent from the following description when taken in connection with the accompanying drawings in which.

Figure 4:
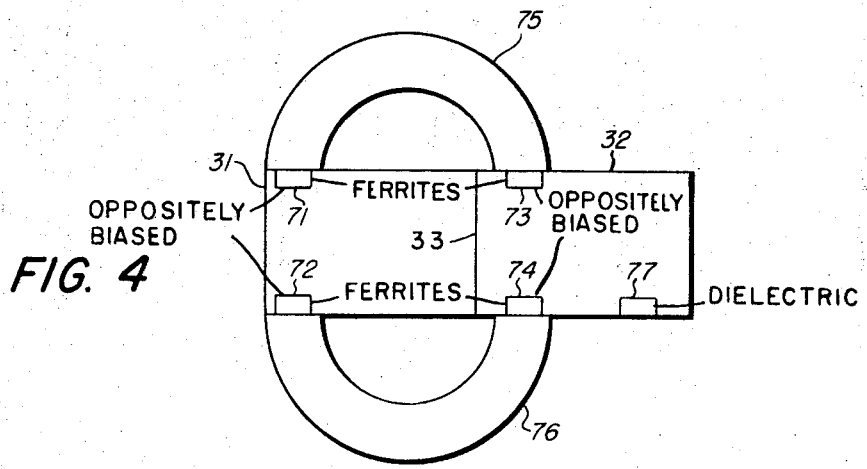

FIG. 4 is an end view of the phase shifting portion of the power divider showing nonreciprocal ferrite phase shifters in both waveguides with means for providing reversed magnetic fields and a reciprocal phase shifter in one of the arms to secure the desired phase shift conditions in both arms for both directions; and FIGS. 5A–5D are schematic representations of phase shifters to facilitate discussion of the development and operation of the phase shifting elements in the power divider.

Figure 1:
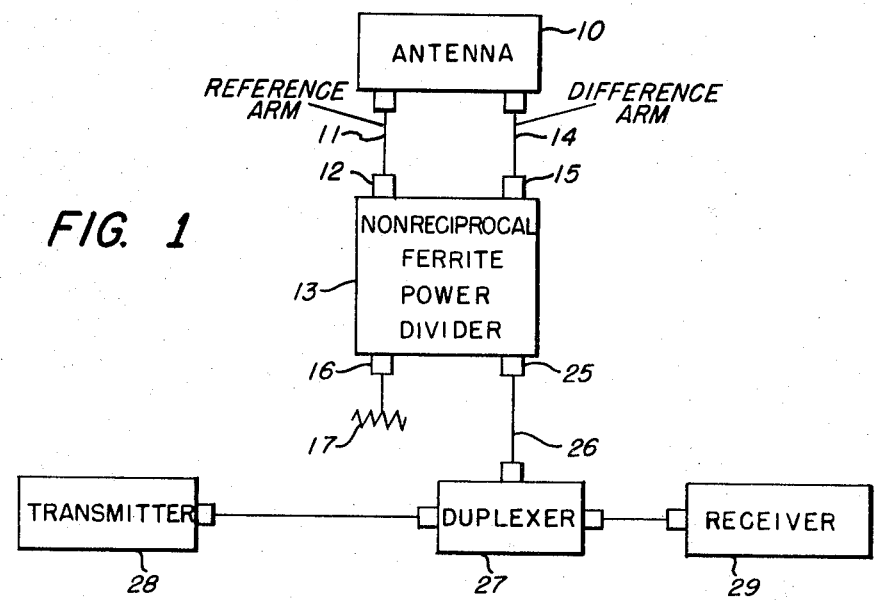
FIG. 1 is a block diagram of an antenna system embodying the invention.

Referring now to FIG. 1 the reference arm of the COSRO antenna 10 is coupled by way of waveguide 11 to one port 12 of a nonreciprocal ferrite power divider 13 more fully described hereinafter. The difference arm or arms of the COSRO antenna 10 are coupled by way of waveguide 14 to one port 15 of the power divider 13. A third port 16 of the power divider 13 is terminated in a non-reflective load 17. The fourth or last port 25 of the power divider 13 is coupled by way of waveguide 26 to a conventional duplexer 27 which in conventional manner suplies energy from the transmitter to waveguide 26 and energy from the antenna in waveguide 26 to the receiver 29.

Figure 2:
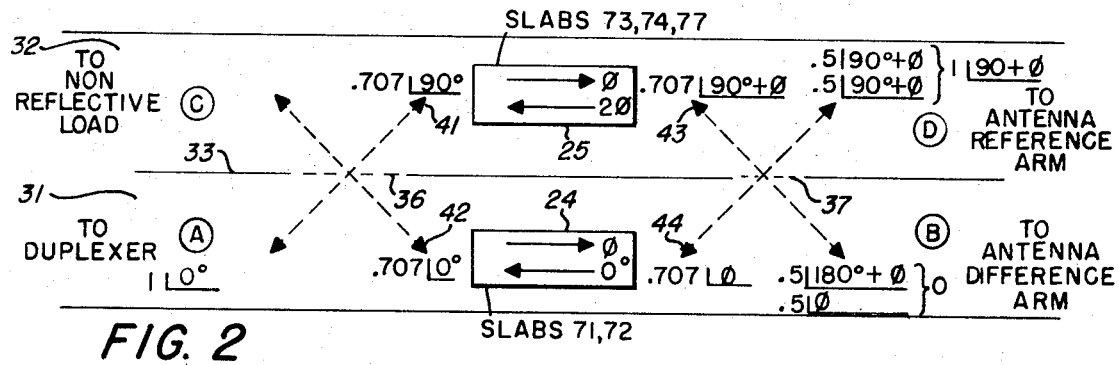
FIG. 2 is a schematic representation of the nonreciprocal ferrite power divider to facilitate discussion of the invention for the transmit condition.

The operation of the nonreciprocal power divider 13 may be more readily described with reference to FIG. 2 which is a schematic representation of a nonreciprocal multibranch circuit in accordance with the invention which makes use of nonreciprocal phase shifting elements with reversed magnetic fields and a reciprocal phase shifting element more completely described hereinafter. FIG. 2 shows two parallel waveguides 31 and 32 which have a common narrow wall 33. Phase shifting means 24 and 25 are located respectively in waveguides 31 and 32. Before and after the phase shifting means 24 and 25 the common wall 33 is apertured. These apertures 36 and 37 are of a type known as directional couplers and are described in articles by S. E. Miller and W. W. Mumford in the "Proceedings of the Institute of Radio Engineers," vol. 40, pp. 1071–1078, February 1952, and by H. J. Riblet in the "Proceedings of the Institute of Radio Engineers," vol. 40, pp. 180–184, February 1952.

In FIG. 2 it may be noted that the phase shifting means 24 and 25 are each shown schematically as a box wherein is indicated the phase shift in the two directions of transmission. The directional coupling apertures 36 and 37 have the property that energy transmitted from terminal A will be split at the aperture 36 and will travel toward terminal B and D but no energy will be coupled to terminal C. This property of directional couplers is developed in detail in the above-noted article by E. S. Miller and W. W. Mumford.

Using two 3 db (.707 amplitude) coupling apertures at 36 and 37 it can be rigorously shown that energy applied to terminal A appears at terminal D.

To see the physical reasons why energy applied at terminal A appears at terminal D the voltage amplitude and phase shift at various points through the waveguide structure must be traced. Starting with unit voltage $1/0°$ applied at terminal A the coupler 36 splits the power equally so that the peak voltage at point 42 is $.707/0°$. The directional coupler structure 36 has the property of shifting the phase of wave energy passing through it by 90 degrees so that the wave at point 41 will be 90 degrees displaced in phase from that of point 42 and is represented as $.707°/90°$. If the electrical length between the apertures 36 and 37 of both waveguides is either equal to or differs by an integral number of full wavelengths the phase shifts resulting therefrom may be ignored. However, due to phase shifting means 25 which has a phase shift of $\phi$ in the desired direction as indicated by the arrow the voltage at point 43 will be $.707/90°+\phi$. Likewise as a result of the phase shift $\phi$ of phase shifting means 24 the voltage at point 44 will be $.707/\phi$. At the second directional coupling aperture 37 the power again splits with one half of the energy in each waveguide being coupled to the opposite waveguide. More explicitly, when each of the two .707 amplitude waves at points 43 and 44 are split the result is two waves each having a voltage amplitude equal to .5 that of the original coherent source. The energy which passes from waveguide 31 to the waveguide 32 will undergo another 90 degree phase shift to provide a voltage $.5/90°+\phi$ in waveguide 32. This voltage combines with the portion of the voltage $.5/90°+\phi$ in waveguide 32 to give a voltage $1/90°+\phi$ at the terminal D. The energy from waveguide 32 which is coupled over to waveguide 31 will also undergo another 90 degrees phase shift to provide a voltage $.5/180°+\phi$ and thus will be in 180 degrees phase opposition to the portion of the wave energy $.5/\phi$ in waveguide 31 and thus the two wave forms will completely cancel each other out at terminal B.

In view of the preceeding discussion it may now be apparent that if equal phase shifts such as, for example, $\phi$ are provided in one direction by phase shifting means 24 and 25 (in the direction of antenna 10) all of the power developed by the transmitter will be coupled to the reference arm of antenna 10 and none will be coupled to the difference arm of antenna 10. This is in conformance with the requirements for COSRO operation. However, for reception it is necessary that the power in the reference arm and difference arm of antenna 10 be combined in the designated proportion to give the desired cross-over value.

Figure 3:
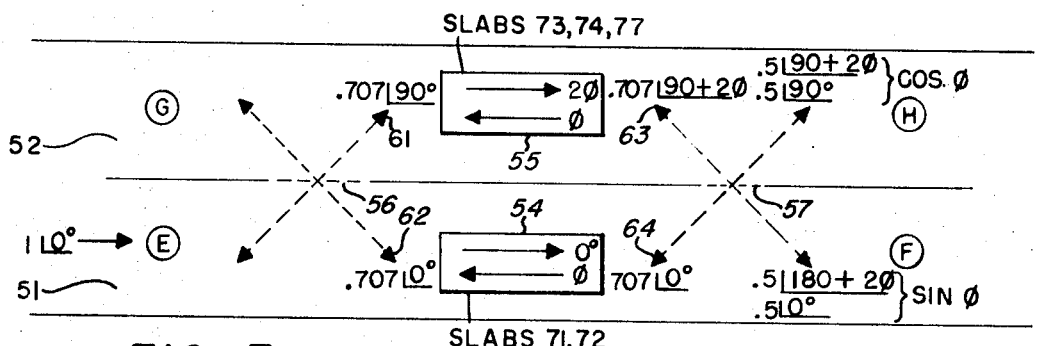
FIG. 3 is a schematic representation of a nonreciprocal ferrite power divider to facilitate discussion of the operation of the invention for the received condition.

The operation of the power divider 13 for reception may be more readily described with reference to FIG. 3 which is a schematic representation of the power divider 13 with the required relative phase shifts for reception. To facilitate discussion of the power divider for reception the operation of the power divider will be described for transmission so that unit voltages may be used, it being understood that the reverse is true for reception. With respect to FIG. 3 the equal phase shifts of $\phi$ may be ignored, this being the case for transmission, and it is assumed that the phase shift provided by phase shifting means 55 in wageguide 52 is $2\phi$, and the phase shift provided by phase shifting means 54 is zero degrees relative to $\phi$. Starting with unit voltage $1<0°$ applied at terminal E the voltage at point 61 is $.707<90°$ and the voltage at point 62 is $.707<0°$ for the reasons given hereinbefore. For the same reason noted above with reference to energy coupling from terminal A to terminal C of FIG. 2, energy will not be coupled from terminal E to terminal G of FIG. 3. By reason of the phase shift of $2\phi$ provided by phase shifting means 55 and the phase shift of 0° provided by phase shifting means 54, the voltage at point 63 is $.707<90+2\phi$ and the voltage at point 64 is $.707<0°$. When each of the two .707 waves at points 63 and 64 are split by aperture 57 the result is four waves each having a voltage amplitude equal to .5 that of the original unit wave. The aforesaid four waves combine to provide two voltages $.5<90°+2\phi$ and $.5<90°$ at terminal H and two voltages $.5<180°+2\phi$ and $.5<0°$ at terminal F. The voltage at terminal H is therefore proportional to cos $\phi$ and the voltage at terminal F is proportional to sine $\phi$.

From the above it may now be evident that the power in the reference and difference arms of antenna 10 may be combined in the desired proportion or ratio by proper selection of a value for $\phi$. This is made more evident from the equation $$\frac{P_{ref}}{P_{diff}} = \left(\frac{\cos \phi}{\sine \phi}\right)^2 = \cot^2 \phi$$

where $P_{ref}$ is received power in the reference arm and $P_{diff}$ is received power in the difference arm.

Although the case of transmission and hence a power split was described with reference to FIG. 3, since the power divider is nonreciprocal it will be readily appreciated that received power will be combined in accordance with the same principle to provide the desired ratio of combination and will be coupled to receiver 29 through waveguide 26 and duplexer 27.

Figure 5A:
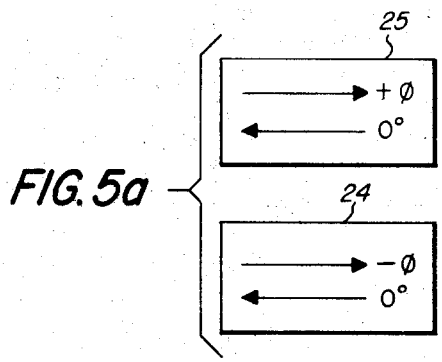
Figure 5B:
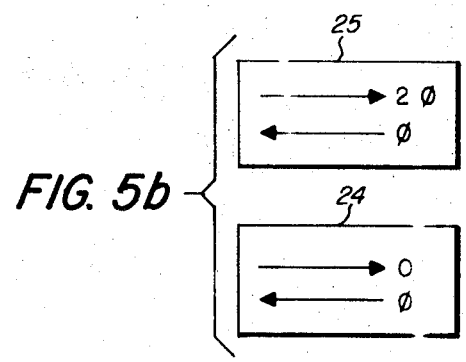

The means for providing the desired phase shifts of phase shifting means 24 and 25 is shown in FIG. 4 and will be explained in conjunction with FIGS. 5A–5D. The desired phase shifts are shown in FIG. 5A but unfortunately such an arrangement is not physically realizable. However, if a phase shift of $\phi$ in both directions is added to the phase shifting means 24 and 25 of FIG. 5A the phase shifting means 24 and 25 will have phase shifts in both directions as indicated in FIG. 5B. It is to be noted that the phase shifts as indicated in FIG. 5B is the same as that indicated in FIG. 2.

Figure 5C:
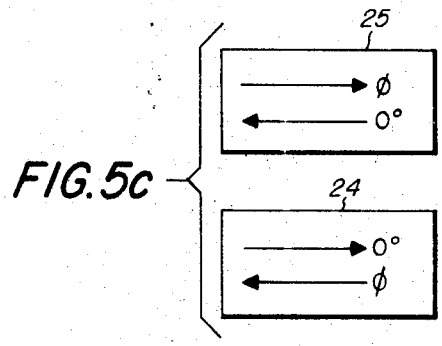
Figure 5D:
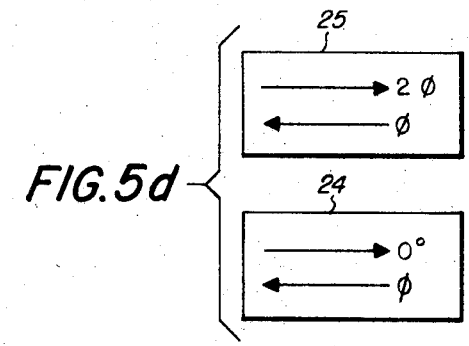

A phase shift as indicated in FIG. 5C may be physically provided by applying reversed magnetic fields to conventional nonreciprocal ferrite phase shifters. Upon inclusion in means 25, for example, of reciprocal phase shifting means the phase shift as indicated in FIG. 5D is realized. It is to be noted that the phase shifts of FIG. 5B and FIG. 5D are identical and also identical to the required phase shifts of means 24 and 25 of FIG. 2.

Returning now to FIG. 4 there are shown elongate gyromagnetic ferrite slabs 71 and 72 oppositely attached in conventional manner to the broad walls of waveguide 31 adjacent the outer narrow wall thereof. Ferrite slabs 71 and 72 provides nonreciprocal phase shifting. Elongate gyromagnetic ferrite slabs 73 and 74 are oppositely attached in like manner to the broad walls of waveguide 32 adjacent the common wall 33. Ferrite slabs 73 and 74 also provides a nonreciprocal phase shifting structure. Magnets 75 and 76, for example, provide the reversed fields with respect to ferrite slabs 71–72 and 73–74 and phase shifts as indicated in FIG. 5C. The provision of an elongate slab 77 of dielectric material in waveguide 32 attached to a broad wall adjacent the outer narrow wall thereof adds a reciprocal phase shift of $\phi$ in waveguide 32 to provide the phase shifts indicated in FIG. 5D. It has been found that if $\phi$ equals about 35.2 degrees, received power in the antenna reference arm and received power in the antenna difference arm will be combined in a ratio of about 2:1.

It is to be understood that the above-described arrangements are illustrative of the application of the principles of the invention. Numerous other arrangements may be devised by those skilled in the art without departing from the spirit and scope of the invention.

What is claimed is:

1. In an antenna coupling system the combination comprising: a plurality of antenna elements; a four port power divider for electromagnetic energy having two of said four ports coupled to different ones of said antenna elements; a common transmission line coupled to another of said ports; and phase shifting means located in said power divider for coupling electromagnetic energy from said another port to one of said two ports and some of the received electromagnetic energy simultaneously incident on each of said two ports to said another port in a predetermined ratio.

2. In an antenna coupling system the combination comprising: a plurality of antenna elements; two waveguides having longitudinally extending axes and coupled to different ones of said antenna elements; two spaced directional couplers interconnecting said waveguides; nonreciprocal ferrite phase shifting means disposed in each waveguide between said spaced couplers, said means being magnetically biased oppositely one with another; and reciprocal dielectric phase shifting means disposed in one of said waveguides between said spaced couplers.

3. In an antenna coupling system the combination comprising: a plurality of antenna elements; two waveguides having longitudinally extending axes and coupled to different ones of said antenna elements; two spaced directional couplers interconnecting said waveguides; at least one element of gyromagnetic material coupled to each waveguide and confined in the interval between said spaced couplers, said elements being magnetically biased oppositely one with another transversely to the axes of said waveguides; and a reciprocal dielectric element coupled to one of said waveguides and confined in the interval between said spaced couplers.

4. In an antenna coupling system the combination comprising: a plurality of antenna elements; two waveguides having longitudinally extending axes and coupled to different ones of said antenna elements; two spaced directional couplers interconnecting said waveguides for transferring a portion of the energy in one of said waveguides to the other waveguide; at least one element of gyromagnetic material coupled to each waveguide and confined in the interval between said spaced couplers, said elements being magnetically biased oppositely one with another transversely to the axes of said waveguides for providing substantially equal and reversed phase shifts in one waveguide with respect to the other in both directions of transmission; and a dielectric element coupled to one of said waveguides and confined in the interval between said spaced couplers.

5. In an antenna coupling system the combination comprising: a plurality of antenna elements; two waveguides having longitudinally extending axes and coupled to different ones of said antenna elements; two spaced directional couplers interconnecting said waveguides for transferring a portion of the energy in one of said waveguides to the other waveguide; said directional couplers being electrically spaced from each other by an integral number of full wavelengths at the frequency of said energy, at least one element of gyromagnetic material coupled to each waveguide and confined in the interval between said spaced couplers, said elements being magnetically biased oppositely one with another transversely to the axes of said waveguides for providing substantially equal and reversed phase shifts in one waveguide with respect to the other in both directions of transmission; and a dielectric element coupled to one of said waveguides and confined in the interval between said spaced couplers for providing an additional reciprocal phase shift in said one waveguide.

6. In an antenna coupling system the combination comprising: an antenna having a reference arm and a difference arm; two waveguides having longitudinally extending axes each coupled to a different one of said antenna arms; two spaced directional couplers interconnecting said waveguides for transferring a portion of the energy in one of said waveguides to the other waveguide; at least one element of gyromagnetic material coupled to each waveguide and confined in the interval between said spaced couplers, said elements being magnetically biased oppositely one with another transversely to the axes of said waveguides for providing substantially equal and reversed phase shifts in one waveguide with respect to the other in both directions of transmission; a dielectric element coupled to one of said waveguides and confined in the interval between said spaced couplers for providing an additional reciprocal phase shift in said one waveguide; and a common transmission line connected to the other end of said one waveguide, the phase shift in said waveguides being such that energy in said transmission line propagated toward said antenna is coupled to said reference arm and received energy on both said antenna arms are coupled in a predetermined ratio to said transmission line.

7. In an antenna coupling system the combination comprising: an antenna having a difference arm for conically scanning received energy and a reference arm for radiating and receiving energy without conical scan; first and second waveguides having longitudinally extending axes each coupled to a different one of said antenna arms; two spaced directional couplers interconnecting said waveguides for transferring a portion of the energy in one of said waveguides to the other waveguide; at least one element of gyromagnetic material coupled to each waveguide and confined in the interval between said spaced couplers, said elements being magnetically biased oppositely one with another transversely to the axes of said waveguides for providing substantially equal and reversed phase shifts in one waveguide with respect to the other in both directions; a dielectric element coupled to said first waveguide and confined in the interval between said spaced couplers for providing an additional reciprocal phase shift in said first waveguide; and a common transmission line connected to the other end of said first waveguide, the phase shift in said first waveguide in the direction for transmission being a predetermined amount and zero relative to said predetermined amount in the opposite direction for reception, the phase shift in said second waveguide being equal to said predetermined amount in the direction for transmission and twice said predetermined amount in the opposite direction for reception.

8. In an antenna coupling system the combination comprising: an antenna having a difference arm for conically scanning received energy and a reference arm for radiating and receiving energy without conical scan; first and second waveguides having longitudinally extending axes each coupled to a different one of said antenna arms; two spaced directional couplers interconnecting said waveguides for transferring a portion of the energy in one of said waveguides to the other waveguide; at least one element of gyromagnetic material coupled to each waveguide and confined in the interval between said spaced couplers, said elements being magnetically biased oppositely one with another transversely to the axes of said waveguides for providing substantially equal and reversed phase shifts in one waveguide with respect to the other in both directions; a dielectric element coupled to said first waveguide and confined in the interval between said spaced couplers for providing an additional reciprocal phase shift in said first waveguide; and a common transmission line connected to the other end of said first waveguide, the phase shift in said first waveguide in the direction for transmission being a predetermined amount and zero relative to said predetermined amount in the opposite direction for reception, the phase shift in said second waveguide being equal to said predetermined amount in the direction for transmission and twice said predetermined amount in the opposite direction for reception, energy in said transmission line propagated toward said first waveguide being coupled to said reference arm only and received energy on both said antenna arms being combined in said first and second waveguides in a predetermined ratio and coupled to said transmission line.

9. In an energy coupling system comprising: at least a first, a second, a third and a fourth terminal; means for coupling substantially all first electrical energy from said first terminal to said fourth terminal; means for coupling at least a part of second electrical energy from said third and fourth terminals respectively to said first terminal; and means to render the ratio of said second electrical energy from said third terminal to said second electrical energy from said fourth terminal at said first terminal independent of the ratio of said first electrical energy at said first terminal at said first electrical energy at said fourth terminal.

10. A power divider having first and second substantially parallel waveguides with a common apertured wall therebetween, said each of parallel waveguides having two end regions, said first waveguide having a first port at one end region and a fourth port at the other end region, said second waveguide having a second port at one end region and a third port at the other end region, and phase shifting means coupling electromagnetic energy from said first port to said third port and coupling electromagnetic energy simultaneously incident to both said third and fourth ports to said first port.

References Cited
UNITED STATES PATENTS

| | | | |
|---|---|---|---|
| 2,849,685 | 8/1958 | Weiss | 333—10 |
| 2,894,216 | 7/1959 | Crowe | 333—7 |
| 3,011,134 | 11/1961 | Reingold | 333—7 |
| 2,948,863 | 8/1960 | Honda | 33—10 |
| 2,973,512 | 2/1961 | Walsh | 333—10 |
| 3,059,192 | 10/1962 | Carter | 333—7 |

RODNEY D. BENNETT, Primary Examiner

R. E. BERGER, Assistant Examiner

U.S. Cl. X.R.

333—1.1, 10, 24.1; 343—854